(Model.)  5 Sheets—Sheet 1.
C. M. GRAY & W. L. CASADAY.
CULTIVATOR AND FERTILIZER DISTRIBUTER.
No. 270,584. Patented Jan. 16, 1883.
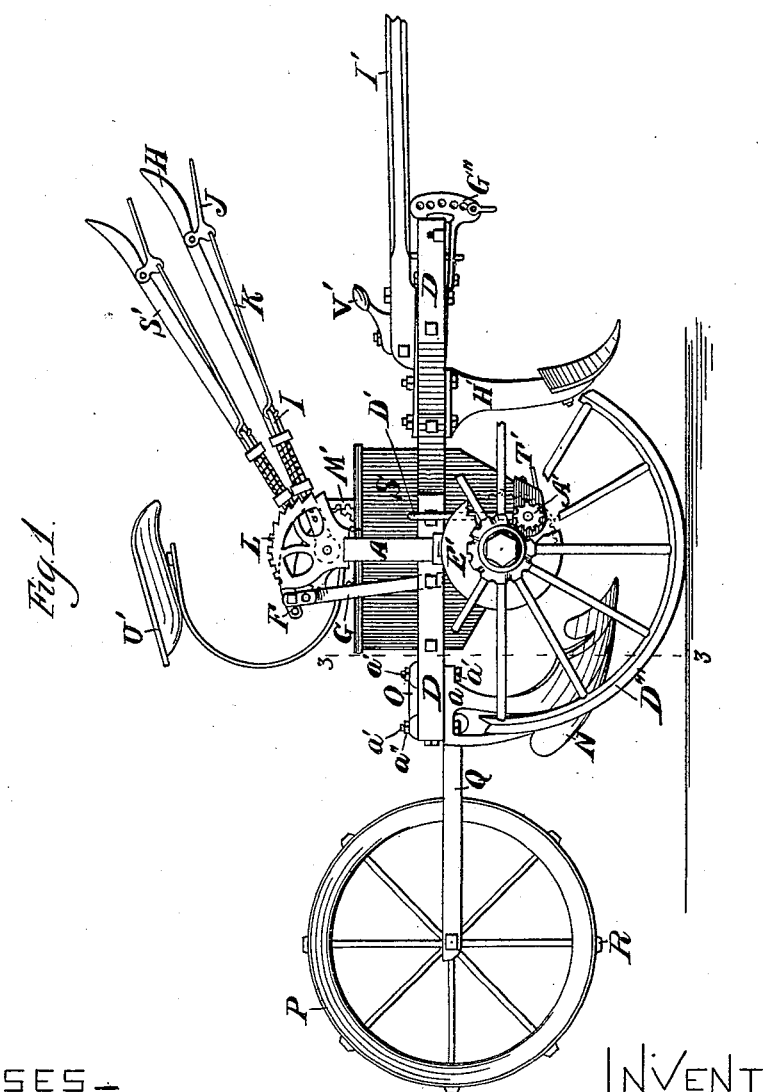

(Model.) 5 Sheets—Sheet 2.
C. M. GRAY & W. L. CASADAY.
CULTIVATOR AND FERTILIZER DISTRIBUTER.
No. 270,584. Patented Jan. 16, 1883.
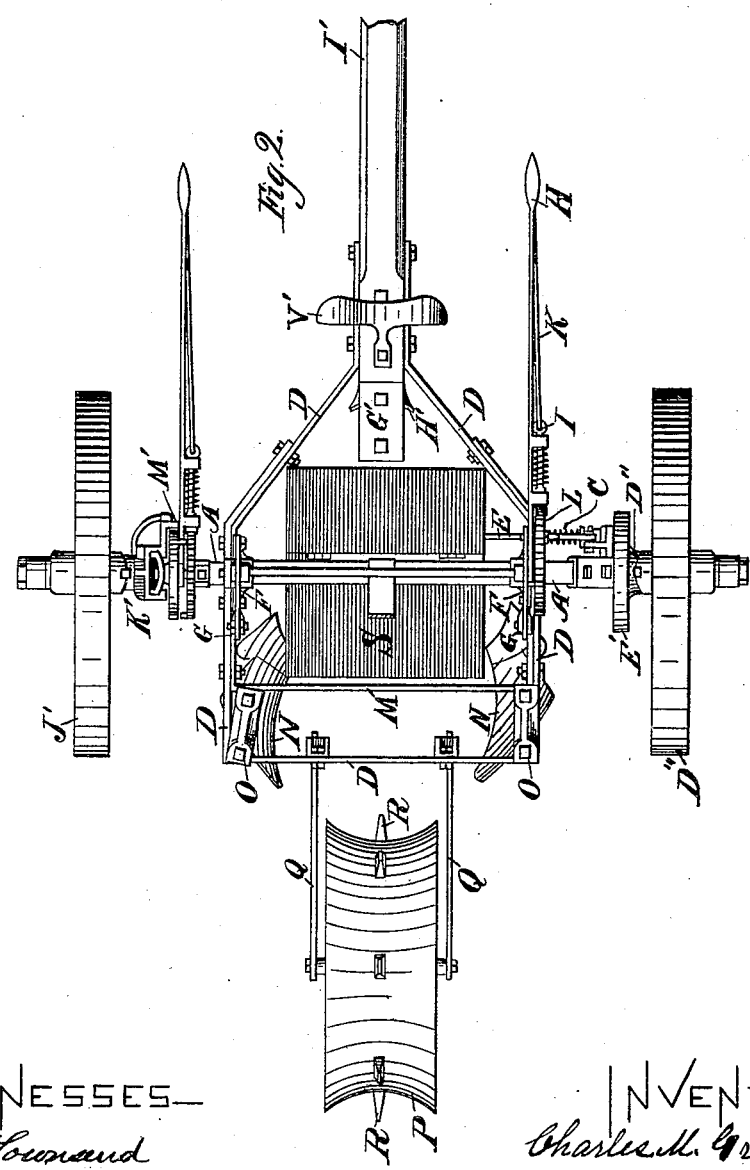

(Model.) 5 Sheets—Sheet 3
C. M. GRAY & W. L. CASADAY.
CULTIVATOR AND FERTILIZER DISTRIBUTER.
No. 270,584. Patented Jan. 16, 1883.
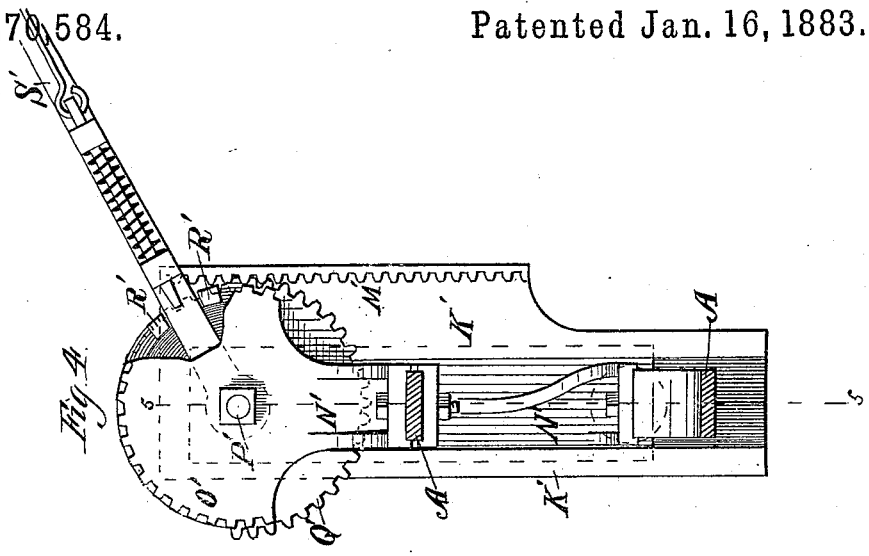
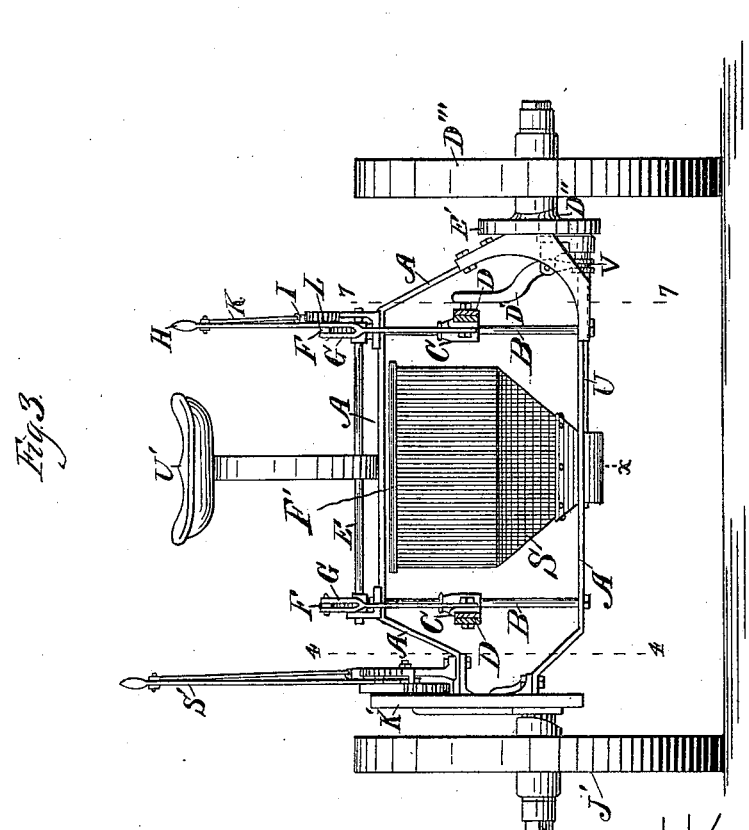
Witnesses—
F. B. Townsend
H. Hauffurter
Inventors.
Charles M. Gray
William Lewis Casaday
By F. F. Warner
their atty.

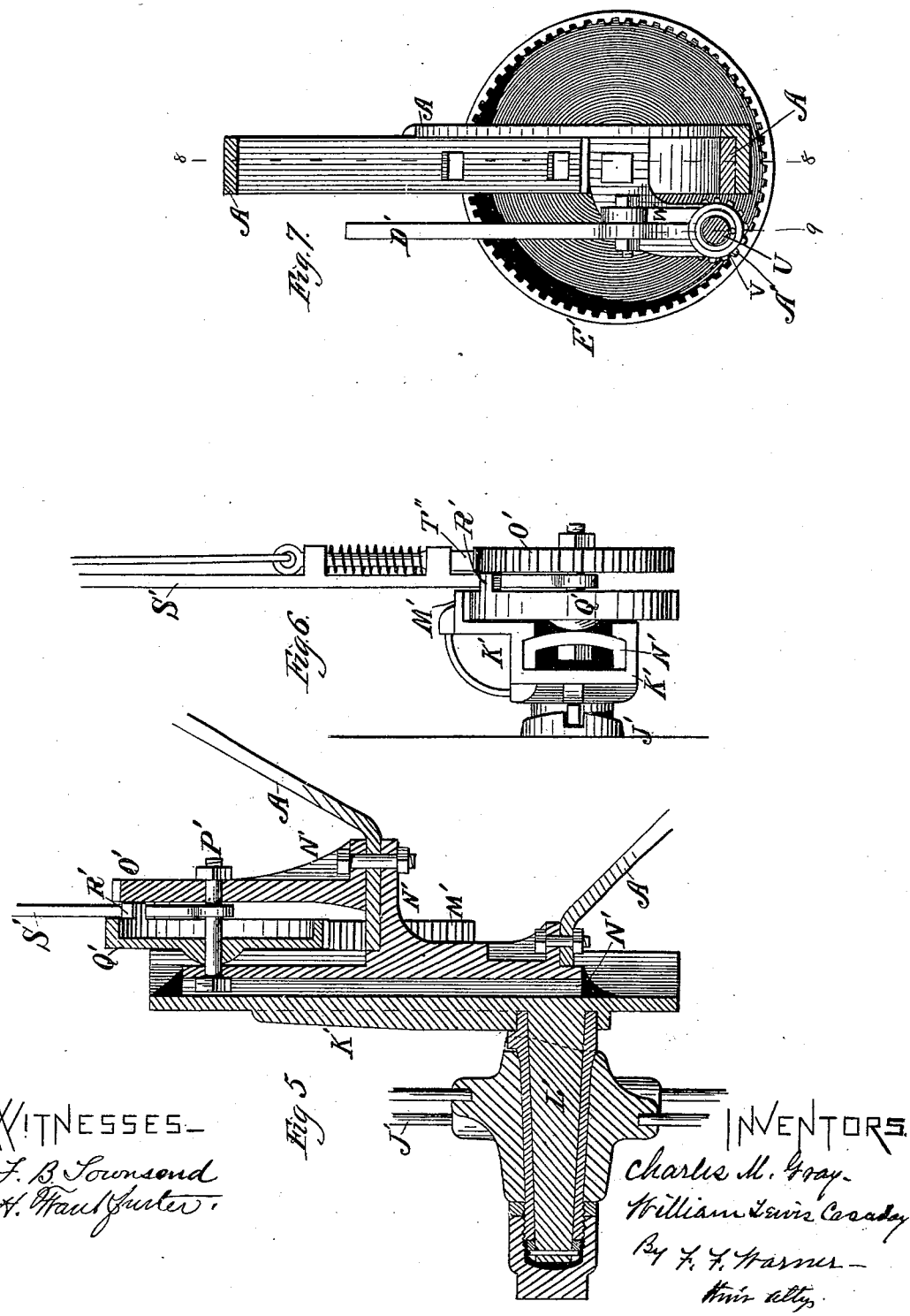

(Model.) 5 Sheets—Sheet 5.
C. M. GRAY & W. L. CASADAY.
CULTIVATOR AND FERTILIZER DISTRIBUTER.
No. 270,584. Patented Jan. 16, 1883.
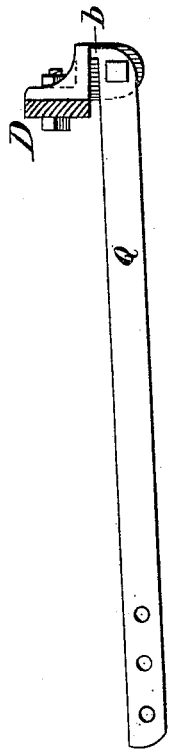
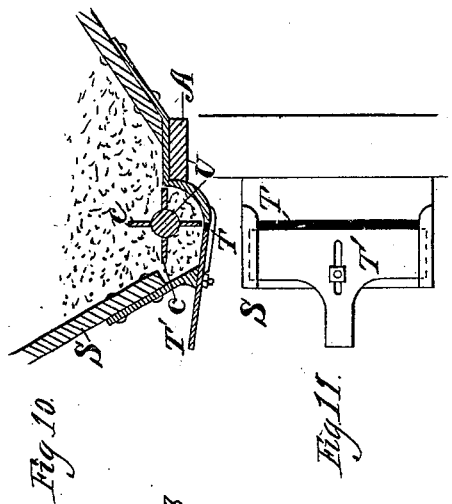
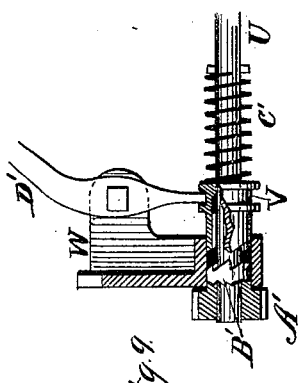
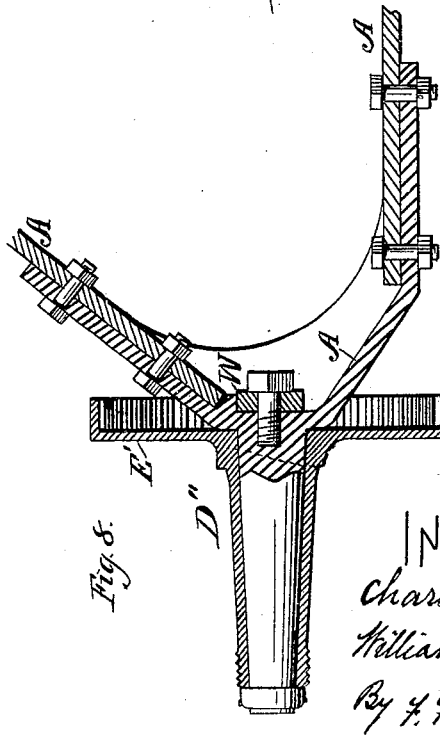
Witnesses
F. B. Townsend
H. Frankfurter
Inventors
Charles M. Gray
William Lewis Cassaday
By F. F. Warner
their Atty

UNITED STATES PATENT OFFICE.

CHARLES M. GRAY, OF CHICAGO, ILLINOIS, AND WILLIAM L. CASADAY, OF SOUTH BEND, INDIANA.

CULTIVATOR AND FERTILIZER-DISTRIBUTER.

SPECIFICATION forming part of Letters Patent No. 270,584, dated January 16, 1883.

Application filed October 8, 1880. (Model.)

*To all whom it may concern:*

Be it known that we, CHARLES M. GRAY and WILLIAM LEWIS CASADAY, respectively of Chicago, in the county of Cook and State of Illinois, and of South Bend, in the county of St. Joseph and State of Indiana, have jointly invented certain new and useful Improvements in Cultivators and Fertilizer-Distributers, of which the following, in connection with the accompanying drawings, is a specification.

In the drawings, Figure 1 is a side elevation of a peanut-cultivator embodying our invention. Fig. 2 is a top or plan view thereof. Fig. 3 is a section at the line 3 3 of Fig. 1. Fig. 4 is a section in the plane of the line 4 4 of Fig. 3. Fig. 5 is a section in the plane of the line 5 5 of Fig. 4. Fig. 6 is a detail showing a top view of a part of the axle-adjusting mechanism. Fig. 7 is a section in the plane of the line 7 7 of Fig. 3. Fig. 8 is a section in the plane of the line 8 8 of Fig. 7. Fig. 9 is a section in the plane of the line 9 9 of Fig. 7. Fig. 10 is a section in the plane of the line $x$ of Fig. 3. Fig. 11 is a bottom view of the feed-slide, and Fig. 12 is a detail of a hanger and bar supporting the dotter-wheel.

Like letters of reference indicate like parts.

Our object is to make an implement especially well adapted for use in preparing ground for planting peanuts, and also adapted to other uses in agricultural labor; and our invention consists in the means, substantially as hereinafter set forth, which we employ for that purpose.

In the drawings, A is a frame or skeleton axle, and B B are vertical guide-rods connecting the upper and lower cross-bars thereof.

C C are vertically-sliding boxes on the rods B B.

D is a horizontal frame or skeleton beam, attached to the boxes C C.

E is a rock-shaft journaled in bearings on the upper cross-bar of the frame A, and F F are arms extending therefrom.

G G are connecting-bars jointed to the arms F F and to the frame D.

H is a lever attached rigidly to the shaft E, and I is a yielding bolt applied to the said lever, and is controlled by means of the bent lever J, pivoted to the lever H and connected to the said bolt by means of the rod K.

L is a toothed segment, rigidly connected to the upper cross-bar of the frame A, and is adapted and arranged to be engaged by the bolt I.

By vibrating the lever H the frame D will be adjusted vertically. The act of seizing this lever will unlock it, and it will become locked automatically when released; but we are aware that levers so made and operating have heretofore been made and long used, and we do not therefore here intend to claim such, broadly.

M is a supplemented cross-bar near the rear end of the frame D and forming a part thereof.

N N are plows. The upper parts or standards of these plows are of such dimensions as to extend from the rear cross-bar of the frame D to or a little way beyond the bar M, and are so formed as to receive vertically-arranged bolts, as is clearly indicated at $a$, Fig. 1.

O O are removable plates or clips, extending from the rear cross-bar of the frame D to the bar M, being supported by those bars, as represented in Fig. 2. The plows may thus be secured adjustably in place by means of bolts $a'$ $a'$, passing through the plates O O and through the upper ends of the plow-standard, and through nuts $a''$ $a''$ run upon the ends of the said bolts. The plows may thus be set either near to each other or far apart, or at various angles to the line of draft, or so that each shall lay the soil toward the other or from each other, or in the same direction, as may be desirable or expedient. We prefer, for many obvious reasons, to use plows having no landside. Used in pairs in the manner described the tendency of one plow to move laterally will be overcome by the tendency of the other to move in the opposite direction, excepting when the furrows are all laid in one direction, and thus, for the most part, all the advantages of plows without landsides are secured—such for example, as decreased friction.

P is a dotter-wheel, journaled in arms or hangers Q Q, so hinged to the rear bar of the frame D as to allow the wheel P to rise and fall or roll freely upon the ground with its full weight while the implement is being drawn along on even or uneven ground. The face or perimeter of this wheel is gouged out, as is clearly indicated in Fig. 2, so that in rolling over soft ground it will leave a smoothly arched or rounded ridge.

R R are the dotter-points, arranged to sink a row of depressions or holes in the ridge formed by the wheel P, in the manner described. The arms Q Q, however, will support the wheel P above the ground when the frame D is raised sufficiently to lift the plows out of the soil; but when the plows are in working position the wheel P will operate in the manner described. The arms Q Q will raise the wheel P when the frame D is raised enough to render the plows inoperative; but when this frame is lowered enough to allow the wheel P to roll upon the ground it will have a slight but sufficient independent up-and-down movement in rolling over uneven ground, which movement is allowed for the reason that only the extreme rear ends of the said arms are permitted to be in contact with the bar to which they are applied, and small studs or pins $b\,b$ extend upward from the said ends for that purpose.

S is a box for containing fertilizing material. This box is seated firmly and rigidly on the lower cross-bar of the frame A, as indicated in Fig. 10. The lower part of the box S is funnel-shaped or flaring, and in the bottom of this flaring part is an opening, T, in connection with which we employ a slide or shut-off, T'. Extending across and arranged a little way above this opening is a flanged or winged shaft, U, on which is a sliding clutch, V, rotating with the said shaft.

W is an ear attached to the frame A, and in which the shaft U has a bearing.

A' is a loose pinion on the end of the said shaft.

B' are rigid teeth or serrations on the pinion A', and these teeth are adapted and arranged, as shown in Fig. 9, to engage with the clutch V when the implement is drawn forward.

C' is a spring to hold the clutch V to its engagement with the teeth B'.

D' is a lever pivoted to the ear W, and the lower end of which enters a groove in the clutch V. As the frame D is raised the upper end of the lever D' is struck thereby and so vibrated that the clutch is drawn from its engagement with the teeth B'.

D'' is a box, to which a wheel, D''', is rigidly applied.

E' is a flange or interiorly-cogged wheel rigidly applied to the box D''.

The engagement of the clutch V with the teeth B' causes the rotation of the shaft U, but that rotation ceases when the said engagement is broken in the manner described. The shaft U therefore is at rest when the plows are not in use. The rotation of the shaft U causes the flanges or wings $c\,c$ thereon to force or feed out the fertilizing material through the opening T, and this material falls upon the ground in front of the wheel P.

F' is a lid on the box S.

G' is a short beam or false tongue, clamped between the forward bars of the frame D.

H' is a cutter depending from the beam G'.

I' is the tongue. This tongue is applied to the upper face of the part G' in such a manner that the forward end of the tongue proper may be vibrated vertically to compensate for the vertical adjustment of the frame D, and means are employed to retain the forward end of the tongue at its proper height after the adjustment of the frame D.

G'' is a clevis on the beam G'.

We do not here claim either a vertically-vibrating tongue or any specific means for adjusting it. We make provision for adjusting the furrow-wheel J' vertically, and although we do not here intend to claim broadly the means herein shown therefor, we will briefly describe the same, as we deem it preferable for the purpose referred to, although any other suitable or well-known means may be employed for that purpose.

K' is a grooved or recessed block, from which the spindle, L', from the wheel J' extends, and M' is a rack on the said block.

N' is a bracket or guide-block rigidly attached to the frame A, and riding in the block K'.

O' is a curved rack or cogged segment.

P' is a bolt passing through the part O' into that part of the bracket or guide N' which rides in the block K'.

Q' is a cogged wheel, mounted freely on the said bolt and engaging the rack M'. The wheel Q' has on it the lugs R' R'.

S' is a lever passing between the lugs R' R', and turning at its inner end on the bolt P'.

T'' is a bolt operating in all respects like the bolt I, but engaging the rack or segment O'. By raising and lowering the lever S' the wheel Q' will be rotated, and as it rotates it will ride either up or down the rack M', according to the direction in which the lever S' is moved. As the wheel O' rides either up or down the rack M', the block N', and consequently the frame A, to which it is attached, will be either raised or lowered with relation to the wheel J'. When that wheel rides in the furrow the frame is to be raised until it is in a horizontal position. The frame may also be adjusted to a horizontal position when the wheel is not in a furrow.

U' is the seat, and V' is a foot-rest.

The operation of the implement is as follows: The frame D should be adjusted vertically in the manner described, so that the plows will run at the proper or desired depth. It should also be adjusted to stand horizontally. The clutch V should be thrown into gear with the teeth B' of the pinion A, which engagement will occur automatically on lowering the plows for work. The wheel P will now roll freely on the ground. The tongue and the draft-eye of the clevis should also be so arranged as to be suited to the work to be done. The slide T' may be regulated to allow the proper quantity of fertilizing material to be fed out from the box S. As the implement is drawn along the cutter H' will cut or break the soil, the shaft U will be rotated, and the wings or flanges $cc$ will feed out the fertilizing material, and it will drop upon the soil broken or cut by the cutter H'. The plows N N will, when set in the position shown, turn up the soil and lay it over in a ridge upon and along the line upon which the fertilizing material has been dropped. The wheel P will then follow and press down the ridge thus formed, packing it smoothly, but not too firmly, and rounding down its edges, and the parts R R will make holes or depressions along this ridge, into which the peanuts may be dropped by an attendant, a suitable number being dropped into each hole, where they may be covered with a suitable depth of soil with facility. When the frame D is raised the plows will be inoperative, the shaft U will be at rest, and the fertilizing material will be confined in the box S. The work may thus be done rapidly, evenly, and economically.

The implement is especially well adapted for the cultivation of peanuts, is simple in its construction and operation, comparatively light, and inexpensive. It is obvious that it may also be used with advantage for other purposes than as a peanut-cultivator. For example, it is suitable to be used in preparing the soil for the planting of cotton and some other crops.

It may not always be necessary to use the fertilizer-box, the dotter-wheel, and the knife H' together.

Having thus described our invention, what we claim as new, and desire to secure by Letters Patent, is—

1. The combination of the fixed frame or yoke A, the centrally-located fertilizer-box S, mounted rigidly on the said frame, the vertically-adjustable frame D, the plows N N, made without landsides, and laterally and independently adjustable on the frame D, and arranged rearward of the said box, and the cutter H', also attached to the frame D and arranged in front of the said box, substantially as and for the purposes specified.

2. The combination of the frame or yoke A, the fertilizer-box S, the vertically-adjustable frame D, the plows N N, the cutter H', and the dotter-wheel, all arranged, substantially as specified, with relation to each other, substantially as and for the purposes specified.

3. The combination, substantially as specified, in connection with a wheeled carriage, of the vertically-adjustable frame D, the plows N N, the cutter H', and a dotter-wheel, all arranged, substantially as specified, with relation to each other, for the purposes set forth.

4. The combination, substantially as specified, in connection with a wheeled carriage, of the vertically-adjustable frame D, the independently-adjustable plows N N, having no landsides, and applied to the said frame, the cutter H', also applied to the said frame, and a vertically-vibrating dotter-wheel, substantially as and for the purposes specified.

5. The combination of the fertilizer-box S, the rotary shaft U, having thereon the wings or flanges $c\ c$, arranged in the feed-aperture of the said box, the lever D', the vertically-adjustable frame D, the clutch V, the pinion A', having thereon the teeth B', and the box D'', carrying the cogged flange E', substantially as and for the purposes specified.

6. The combination, in a peanut-cultivator, of the skeleton axle or frame A, the fertilizer-box S, rigidly applied thereto, the vertical guide-rods B B, the boxes C C, the frame D, the rock-shaft E, the connecting-arms G G, the lever K, provided with a catch or bolt, and the segment L, substantially as and for the purposes specified.

CHARLES M. GRAY.
WILLIAM LEWIS CASADAY.

Witnesses as to the signature of Charles M. Gray:
F. F. WARNER,
H. FRANKFURTER.

Witnesses as to the signature of William Lewis Casaday:
J. H. SERVICE,
JNO. A. DENNIS.